(12) United States Patent
Ayyagari et al.

(10) Patent No.: US 11,137,323 B2
(45) Date of Patent: Oct. 5, 2021

(54) METHOD OF DETECTING ANOMALIES IN WAVEFORMS, AND SYSTEM THEREOF

(71) Applicants: KABUSHIKI KAISHA TOSHIBA, Minato-ku (JP); Toshiba Memory Corporation, Minato-ku (JP)

(72) Inventors: Sai Prem Kumar Ayyagari, Karnataka (IN); Arun Kumar Kalakanti, Karnataka (IN); Topon Paul, Kawasaki (JP); Shigeru Maya, Yokohama (JP); Takeichiro Nishikawa, Yokohama (JP)

(73) Assignees: KABUSHIKI KAISHA TOSHIBA, Minato-ku (JP); Toshiba Memory Corporation, Minato-ku (JP)

( * ) Notice: Subject to any disclaimer, the term of this patent is extended or adjusted under 35 U.S.C. 154(b) by 358 days.

(21) Appl. No.: 16/186,762

(22) Filed: Nov. 12, 2018

(65) Prior Publication Data
US 2020/0149998 A1 May 14, 2020

(51) Int. Cl.
*G01M 99/00* (2011.01)
*G06N 20/00* (2019.01)

(52) U.S. Cl.
CPC .......... *G01M 99/005* (2013.01); *G06N 20/00* (2019.01)

(58) Field of Classification Search
CPC .............................. G01M 99/005; G06N 20/00
USPC ......................................................... 702/183
See application file for complete search history.

(56) References Cited

U.S. PATENT DOCUMENTS

2005/0143976 A1* 6/2005 Steniford ................ G10L 25/69 704/202
2013/0173218 A1* 7/2013 Maeda ............... G05B 23/0221 702/182

FOREIGN PATENT DOCUMENTS

| JP | 2011-7553 | 1/2011 |
|----|-----------|--------|
| JP | 5778305 | 9/2015 |
| JP | 2016-200971 | 12/2016 |

OTHER PUBLICATIONS

Paparrizos, J. et al., "k-Shape: Efficient and Accurate Clustering of Time Series", ACM SIGMOD International Conference on Management of Data, 2015, pp. 16.
Folgado, D. et al., "Time Alignment Measurement for Time Series", Pattern Recognition, vol. 81, 2018, pp. 12.

* cited by examiner

*Primary Examiner* — Catherine T. Rastovski
*Assistant Examiner* — Aeysha N Sultana
(74) *Attorney, Agent, or Firm* — Oblon, McClelland, Maier & Neustadt, L.L.P.

(57) ABSTRACT

A method and system for detecting anomalies in waveforms in an industrial plant. During a learning stage, one or more training waveforms are received from sensors monitoring a plurality of equipment in the industrial plant. The one or more training waveforms are used to generate a representative waveform and deviations of the one or more training waveforms from the representative waveform are determined. Based on the deviations, groups are created. A model may be associated with each group for building an expected waveform pattern. When test waveforms are received, based on the electrical and physical properties of the test waveforms, each test waveform is classified into one of the groups. Thereafter, each waveform is compared with the expected waveform pattern associated with the group to which the respective test waveform belongs, to detect the anomaly.

17 Claims, 8 Drawing Sheets

METHOD OF DETECTING ANOMALIES IN WAVEFORMS, AND SYSTEM THEREOF

TECHNICAL FIELD

The present disclosure relates in general to industrial plant monitoring. More specifically, the present disclosure relates to detecting anomalies in waveforms in the industrial plant.

BACKGROUND

In a manufacturing plant/factory, quality of products or progress of various processes are monitored using various sensors mounted on industrial equipment. For example, vibrations in motors, stator current in motors, output current and voltage in generators, and the like are monitored for analysis, thereby determining quality of equipment. Similarly, during operation of a power plant or a power equipment, the power generated, the voltage and current of the output lines, etc., are also monitored through various kinds of sensors. The sensors generate a huge volume of time-series waveform data measured over a period of time. The measured data consists of huge amount of normal data (expected waveforms) and a small amount of abnormal data (unexpected waveforms or waveforms generated due to fault in equipment). Accurate detection of anomaly (abnormal signals) in the huge volume of time-series waveform data is important to increase the productivity of the plant/factory. Also, such detection of anomalies improves the quality of the manufactured products, thereby improving the reliability of the operation of plant/factory/power plant. Further, timely maintenance can be scheduled reducing damages to the equipment.

The volume of normal data of a sensor is extremely high compared to the volume of abnormal data. In conventional approaches, anomalies in the waveforms is detected using a single model which use only the normal data. The conventional approach generalizes the patterns of normal data from the sensors. However, variation in environmental conditions and/or variation in manufacturing different equipment leads to introduction of variable process time as well as multiple process patterns/characteristics, which generate multiple patterns of normal data. By generalizing the patterns of normal data from a sensor, the conventional approach changes the characteristics of the normal data, leading to improper detection of anomaly or triggering a high number of false alarms. Also, maintenance activity cannot be scheduled thereby causing damages to equipment.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, a method and system are disclosed for detecting anomalies in waveforms in an industrial plant. The industrial plant may comprise a plurality of equipment which are monitored using a plurality of sensors. The plurality of sensors may measure various signals, such as voltage and current in the plurality of equipment. The plurality of sensors generates a plurality of waveforms based on the measurement. The system receives the plurality of waveforms from the plurality of sensors. Each waveform comprises an either expected signal or unexpected signal. The plurality of waveforms consists of a plurality of training waveforms and a plurality of test waveforms. The plurality of training waveforms is used to create a plurality of groups and to build models to create a plurality of reference waveforms. The plurality of test waveforms is used to detect anomaly in the industrial plant. Based on one or more electrical and physical properties of the plurality of test waveforms, each test waveform is classified into a group among a plurality of groups. Each group is associated with a reference waveform generated using one or more models. Thereafter, each test waveform is compared with reference waveform pattern associated with a group to which the respective test waveform is classified. Based on the comparison, anomaly in each test waveform is detected.

In an embodiment, the reference waveform is generated for each group. During a learning stage, plurality of training waveforms is received from the plurality of sensors. The plurality of training waveforms comprises expected and unexpected signals. Thereafter, the representative waveform is generated using the plurality of training waveforms. Further, plurality of training waveforms is compared with the representative waveform. Based on the comparison, a plurality of groups is created. Each group may be associated with a model. The model may be used to generate a reference waveform pattern which represents expected waveform. The reference waveform pattern may be compared with plurality of test waveforms from the plurality of sensors to determine anomalies in the plurality of test waveforms.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
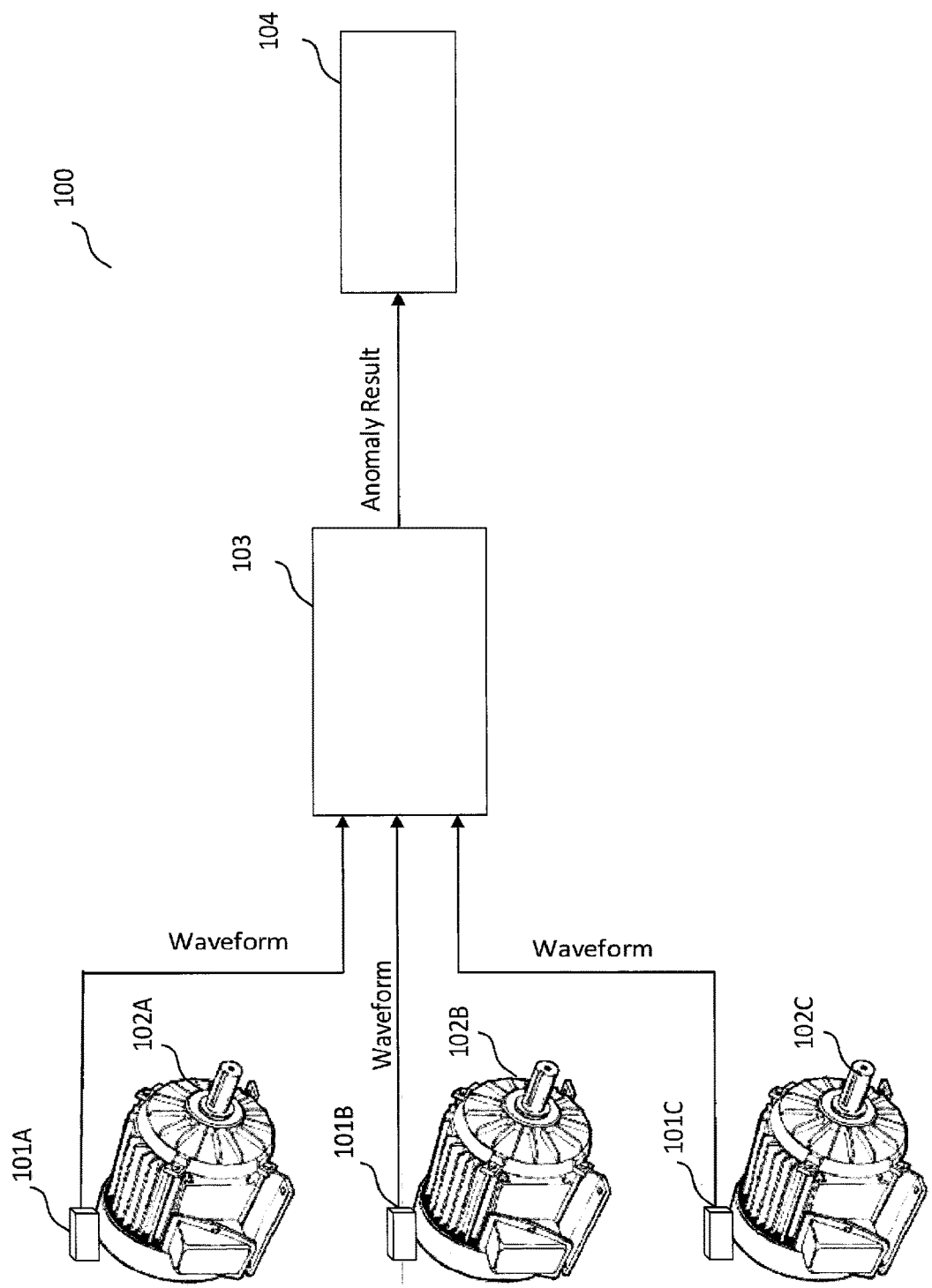
FIG. 1 shows a block diagram of an environment of an industrial plant for detecting anomalies in waveforms, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and system for detecting anomalies in waveforms in an industrial plant. During a learning stage, a plurality of waveforms is received from a plurality of sensors monitoring a plurality of equipment in the industrial plant. The plurality of waveforms comprises training waveforms and test waveforms. The training waveforms are used to generate a representative waveform and a deviation of each training waveform from the representative waveform is determined. Based on the deviation, a plurality of groups is created. One or more models may be associated with each group for building an expected waveform pattern (reference waveform pattern). In one embodiment, an unexpected waveform pattern may also be generated, and further steps may be accordingly performed. However, the present disclosure is explained considering the scenario that an expected waveform is generated. Further, a range of anomaly scores is calculated for each reference waveform pattern, which is used for detecting anomalies in waveforms received in real time. In an embodiment, the waveforms received in realtime can be referred as test waveforms in the present disclosure. In real-time (normal operation of the industrial plant) a plurality of test waveforms is received. Based on electrical and physical properties of the plurality of test waveforms, each test waveform is classified into one of the plurality of groups created during the learning stage. Thereafter, each test waveform is compared with the reference waveform pattern associated with the group to which the respective test waveform is grouped for detecting the anomaly.

Reference is made to FIG. 1. In an embodiment, FIG. 1 shows a block diagram of an environment of an industrial plant (100). In an alternate embodiment, the industrial plant may be a process plant or a power plant. The industrial plant (100) may comprise a plurality of equipment (102A, 102B, 102C). The plurality of equipment (102A, 102B, 102C . . . 102N) may be collectively referred as equipment (102). The equipment (102) may include but not limiting to a motor, a generator, a transformer, circuit breaker, and any other equipment used in industrial plant or process plant or power plant. The equipment (102) are monitored by a plurality of sensors (101). In an example embodiment, equipment (102A) may be monitored by sensor (101A), the equipment (102B) may be monitored by sensor (101B) and so on. The sensors (101A, 101B . . . 101N) may be collectively denoted as sensors (101). The sensors (101) may include current sensor, voltage sensor, vibration sensor, temperature sensor, and may include any other sensors generally used in industrial plant (100) or a process plant or a power plant. In one embodiment, the sensors (101) may be mounted on corresponding equipment for measuring parameters (current, voltage, vibration, temperature) of the equipment (102). In another embodiment, the sensors (101) may be placed such that the parameters are measured effectively from the equipment (102).

In one embodiment, the sensors (101) generate a plurality of waveforms corresponding to the measurements. The plurality of waveforms may be analog waveforms or digital waveforms. In an embodiment, the plurality of waveforms may be used by an anomaly detection system (103) to detect fault in working of the equipment (102). For example, if a motor current parameter is measured by a current sensor, the waveforms generated by the current sensor is used to analyse if the motor is working in expected way. If the waveform deviates from an expected pattern/amplitude/frequency/phase, such an anomaly is detected to determine a fault in the working of the motor and appropriate actions can be taken by an operator in the industrial plant (100). By detecting such anomalies maintenance activities can be scheduled and risks of damaging the equipment (102) can be reduced. In an embodiment, the plurality of waveforms may be time-series waveforms. In an embodiment, the plurality of waveforms consists of a plurality of training waveforms or a plurality of test waveforms. The training waveforms are waveforms obtained during a learning stage of the anomaly detection system (103). In an embodiment, the test waveforms are obtained in real-time to detect anomalies in the test waveforms. In an embodiment, the anomaly detection system (103) may provide the detected anomaly (anomaly result) to a notification unit (104). In an embodiment, the anomaly detection system (103) may specifically designed as per the industrial equipment (102) or may be generic system that may include one or more servers, supercomputers, workstations, laptops or any other electronic device capable of processing the plurality of waveforms.

In an embodiment, the industrial plant (100) may comprises a database (not shown) to store the plurality of waveforms consisting of a plurality of test waveforms and a plurality of training waveforms. In one embodiment, the anomaly detection unit (103) may be capable of retrieving the plurality of waveforms from the database. In an embodiment, the anomaly detection system (103) may communicate with the database or the plurality of sensors (101) through a plant network (not shown) provided in the industrial plant (100). The anomaly detection system (103) may be disposed in communication with the plant network via a network interface. The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The plant network may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc.

In an embodiment, the notification unit (104) may be a display module to display a fault in the equipment (102). In one embodiment, the notification unit (104) may include an alarm for notifying an operator in case of an emergency situation (for example when there is a motor overload or a transformer blast and the like). The notification unit (104) may be used to take appropriate actions (maintenance activity or configuring equipment parameters) timely.

Figure 2:
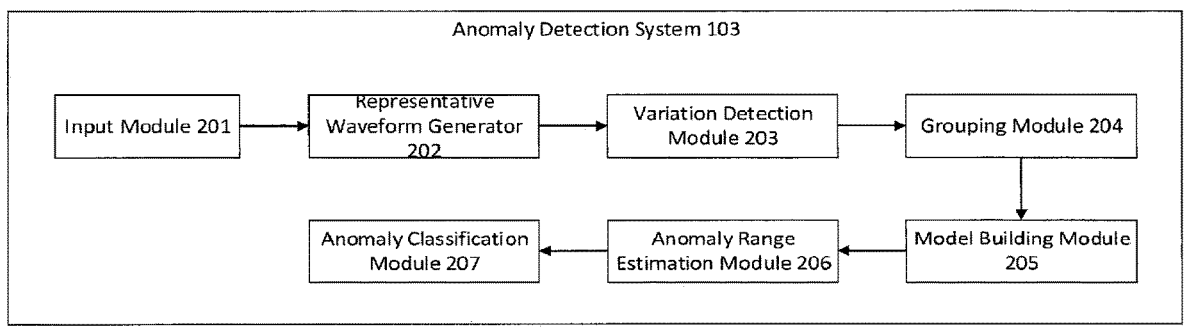
FIG. 2 shows an exemplary block diagram of an anomaly detection system for detecting anomalies in waveforms, in accordance with an embodiment of the present disclosure.

Reference is now made to FIG. 2 illustrating the working of the anomaly detection system (103) in detail. As shown, the anomaly detection system (103) comprises an input module (201), a representative waveform generator (202), a variation detection module (203), a grouping module (204), a model building module (205), an anomaly range estimation module (206) and an anomaly classification module (207). As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules when configured with the functionality defined in the present disclosure will result in a novel hardware.

In an embodiment the input module (201) may receive the plurality of waveforms consisting of a plurality of training waveforms and a plurality of test waveforms from the plurality of sensors (101). In one embodiment, the input module (201) may retrieve the plurality of waveforms from the database. In one embodiment, the input module (201) may receive training waveforms required to building models to detect anomaly or may receive test waveforms for detecting anomaly. In an embodiment, the test waveforms may also be used to update existing models and simultaneously detect anomaly in the test waveforms.

In an embodiment, the representative waveform generator (202) may generate a representative waveform pattern from the plurality of training waveforms received during the learning stage. Representative waveform generator (202) may first pre-process the plurality of training waveforms received during the learning stage and then create a representative waveform pattern. Pre-processing may include smoothing of the plurality of the training waveforms by applying low-pass filter and/or high-pass filter and selection of appropriate training waveforms for building of models for anomaly detection.

In an embodiment, the variation detection module (203) is used to determine a deviation (or variation for test waveforms from the reference waveforms) in one or more electrical and physical parameters of each of the plurality of training waveforms from the electrical and physical parameters of the representative waveform pattern. The variation may include a shape changes, amplitude changes, phase changes, frequency changes, current or voltage value changes.

In an embodiment, the grouping module (204) groups the training waveforms which have similar deviations from the representative waveform pattern. Further, such similar training waveforms are grouped into groups, thereby generating a plurality of groups. In an embodiment, each group may be associated with one or more models based on the characteristic deviation. In an embodiment, the category is also referred to as a group in this disclosure and category and group are used interchangeably throughout the disclosure.

In an embodiment, the model building module (205) may train the one or more models associated with respective group to generate a reference waveform pattern. The reference waveform pattern of a group indicates an expected waveform pattern for the group.

In an embodiment, the anomaly range estimation module (206) estimates a range of anomalous values beyond which the waveforms may be considered as a fault/unexpected pattern.

In an embodiment, the anomaly classification module (207) is configured to compare a test waveform (real-time waveform) with corresponding reference waveform patterns. Based on comparison, an anomaly score is generated for the test waveform. If the anomaly score lies within the anomaly range generated for corresponding reference waveform pattern, the test waveform is classified as an expected/desired waveform. If the anomaly score lies beyond the anomaly score generated for corresponding reference waveform pattern, the test waveform is classified as an unexpected/faulty waveform. In an embodiment, the classified result may be provided to the notification unit (104).

Figure 3:
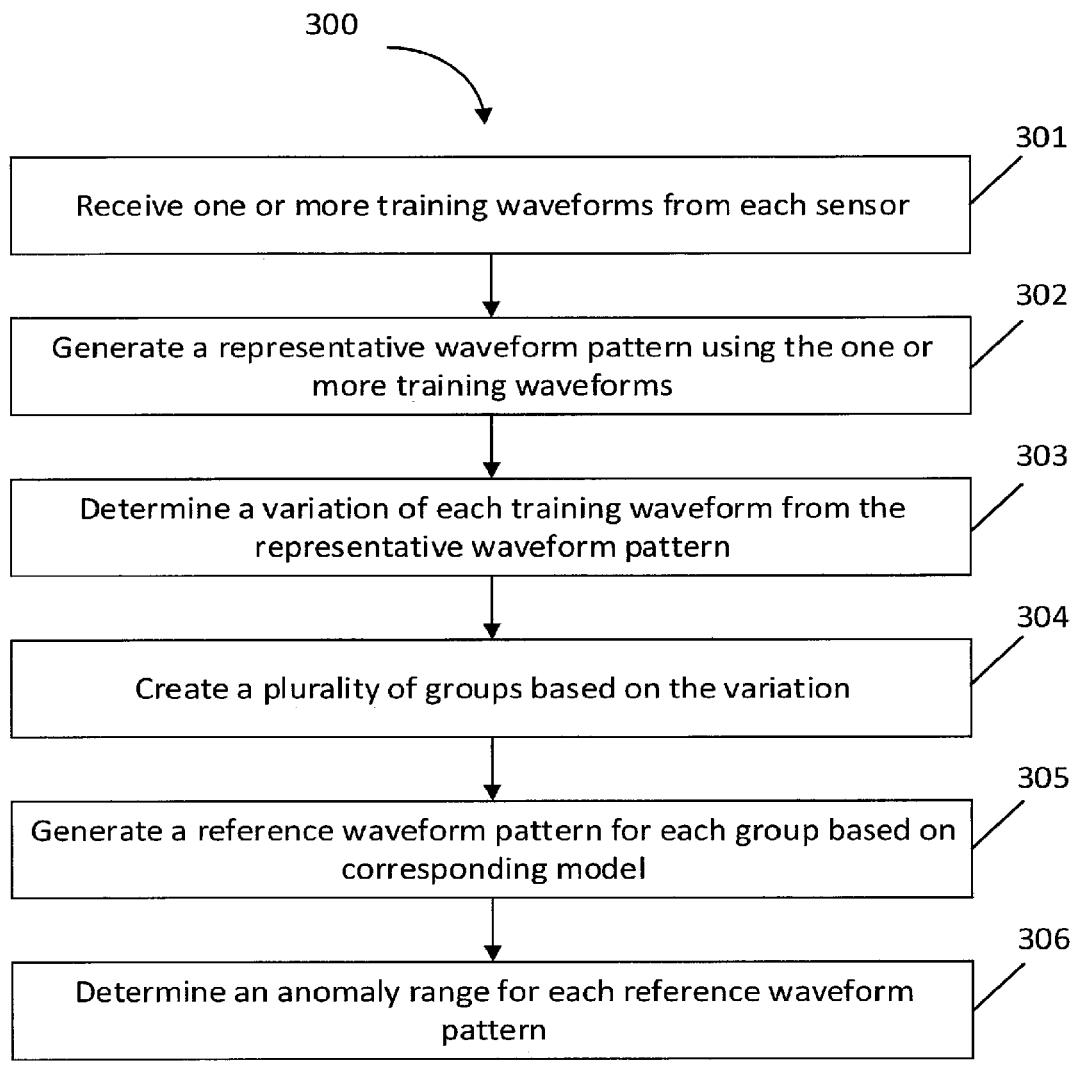
FIG. 3 shows an exemplary flow chart illustrating method steps for generating a reference waveform pattern for detecting anomalies in waveforms, in accordance with an embodiment of the present disclosure.

FIG. 3 shows a flow chart illustrating a method for generating reference waveform patterns for detecting anomalies in waveforms, in accordance with some embodiments of the present disclosure.

As illustrated in FIG. 3, the method 300 may comprise one or more steps for generating reference waveform patterns for detecting anomalies in test waveforms, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the input module (201) receives a plurality of training waveforms during a learning stage. The plurality of training waveforms may be time series waveforms. The plurality of training waveforms may be voltage signals or current signals measured from equipment (102) by the plurality of sensors (101). In an embodiment, the plurality of training waveforms may comprise only expected waveforms. In another embodiment, the plurality of training waveforms may comprise minimal unexpected waveforms.

Figure 4:
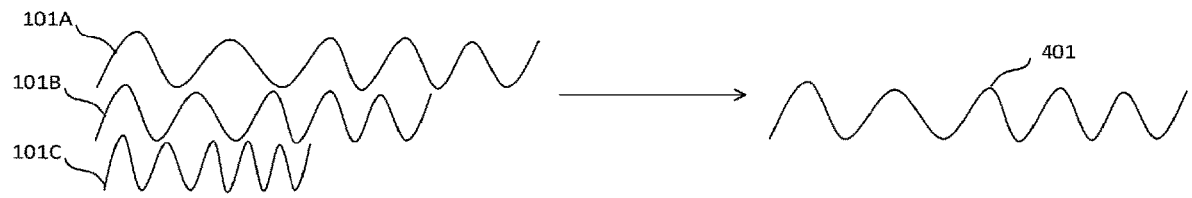
FIG. 4 illustrates generating representative waveform pattern, in accordance with an embodiment of the present disclosure.

At step 302, the representative waveform generator (202) generates a representative waveform pattern using the training waveforms. In an exemplary embodiment, Dynamic Time Warping (DTW) Barycenter Averaging (DBA) is one of the techniques used to create the representative waveform pattern. A person skilled in the art will appreciate that any such techniques can be used. DBA technique determines the representative waveform pattern for a set of pre-processed training waveforms. The approach for finding the representative waveform pattern is performed by iteratively minimizing the sum of squared distances between the representative waveform pattern and the Asymmetric Dynamic Time Warping (ADTW) aligned training waveforms. Asymmetric Dynamic Time Warping (DTW) alignment is a method to warp two different time series reference and query of different or same length to generate a modified query of length reference with minimal pairwise distance between reference and modified query. The distance can be calculated using Euclidian, Mahalanobis, cosine distance or any other suitable techniques. FIG. 4 shows an example of generating a representative waveform pattern (401) from 3 training waveforms. In an embodiment, the representative waveform pattern (401) may comprise averaged electrical and physical properties of the input training waveforms. After the length of each training waveform is made equal, any distance calculation technique, such as, Euclidean method, Time Alignment Measure (TAM), Mean Difference Sum (MDS), Shape Based Distance (SBD), Mahalanobis' distance, Correlation-based distance, or a weighted average of the above measures, to name a few ones can be used to calculate distance. TAM characterizes the amount of temporal alignment difference between the representative waveform pattern (401) and the training waveforms. Whereas MDS characterizes the amount of amplitude difference between the representative waveform pattern (401) and the training waveforms.

Referring back to FIG. 3, at step 303, the variation detection module (203) detects a deviation (or variation of test waveforms) in electrical and physical parameters of each training waveform from the electrical and physical parameters of the representative waveform pattern (401). In an embodiment the training waveforms may be of variable lengths. Therefore, length of the training waveforms may be aligned with the representative pattern. To align each training waveform with the representative pattern, technique such as ADTW can be used. In an alternative embodiment, a last value of shorter training waveform is repeated or remove the part exceeding the length of the shorted waveform. In an embodiment, random removal of values from the longer training waveforms may be used.

Figure 5A:
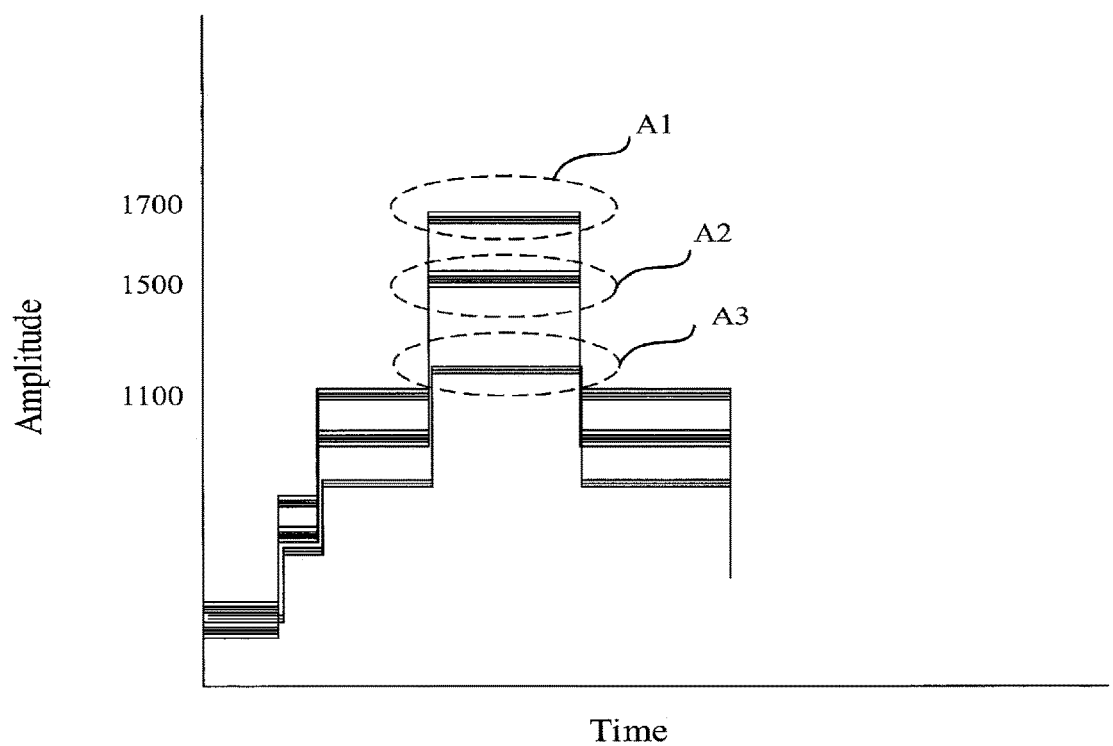
FIG. 5A shows a graph illustrating training waveforms having different amplitude, in accordance with an embodiment of the present disclosure.
Figure 5B:
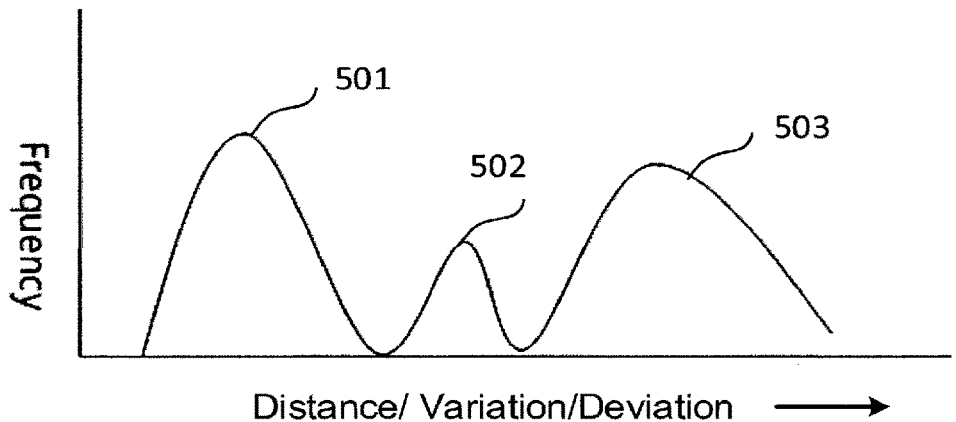
FIG. 5B shows an exemplary graph for classifying a plurality of waveforms into groups for detecting anomalies in waveforms, in accordance with an embodiment of the present disclosure.

At step 304, a plurality of groups is created based on the variation. Each group represents a variation type. For example, as shown in FIG. 5A, let us consider 100 training waveforms. Among 100 training waveforms let us consider 30 waveforms have amplitude A1, 60 waveforms have amplitude A2 and 10 waveforms have amplitude A3. The 100 training waveforms are compared with the representative waveform pattern (401) and a variation (distance) of each training waveform from the representative waveform pattern (401) is determined. If the amplitude distance alone is considered, the training waveforms having amplitude A1 results in distance D1, the training waveforms having amplitude A2 results in distance D2 and the training waveforms having amplitude A3 results in a distance D3. Thus, three unique groups can be formed on the basis of amplitude. Likewise, all the electrical and physical parameters are considered for determining distance. In an embodiment, each parameter may be provided with priority. For example, shape of the waveforms may be provided highest priority. FIG. 5B shows a graph of frequency of training waveforms having different distances. As seen in the graph (FIG. 5B), three peaks are shown (501, 502 and 503). Each of the three peaks represents a set of training waveforms which has similar distances/variation/deviation from the representative waveform pattern (401). Each peak thus forms a group. For example, peak 501 in FIG. 5B may represent training waveforms having distance in the vicinity of 1700 units as shown in FIG. 5A. Likewise, peak 502 may represent waveforms having distance in the vicinity of 1100 units and peak 503 may represent waveforms having distance in the vicinity of 1500 units. Thus, three groups may be created based on the distance of the waveforms from the representative waveform pattern (401). In an embodiment, techniques like Euclidean may be employed to determine the distance. Further, techniques like peak detection may be employed to detect peaks with varying distances. Further, techniques like K-means clustering may be used to classify the waveforms into groups.

Referring back to FIG. 3, at step 305, the model building module (205) may generate the reference waveform pattern using the group representative waveform pattern. The reference waveform pattern may indicate the operator of an expected waveform. The model building module (205) may employ machine learning techniques to build the model. Various classification techniques, such as one-class support vector machine (OCSVM), auto-encoder of deep neural network (DNN), or long short-term memory (LSTM) of deep neural network can be used. Even different classification techniques can be used for the grouped training waveforms. For example, OCSVM for group A, auto-encoder for group B, and LSTM for group C can be used. Here description of auto-encoder is given.

Figure 6A:
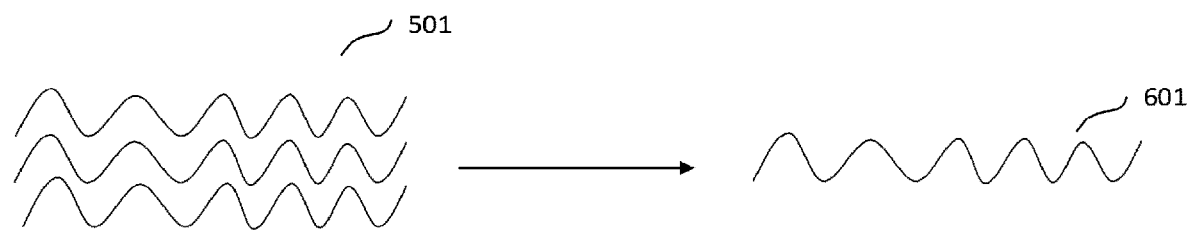
FIGS. 6A-6C illustrate generating a group representative pattern for each group for detecting anomalies in waveforms, in accordance with an embodiment of the present disclosure.
Figure 6B:
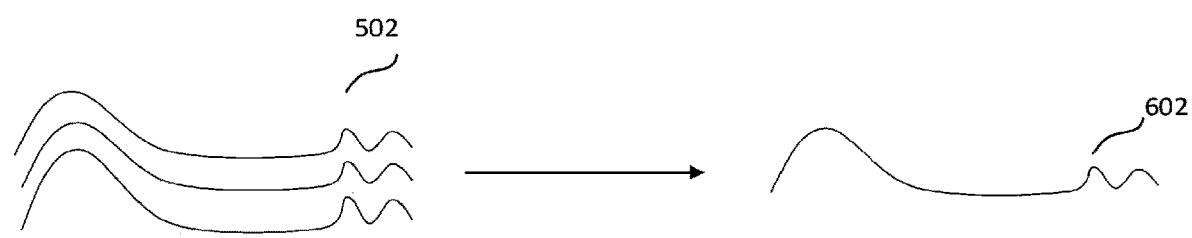
Figure 6C:
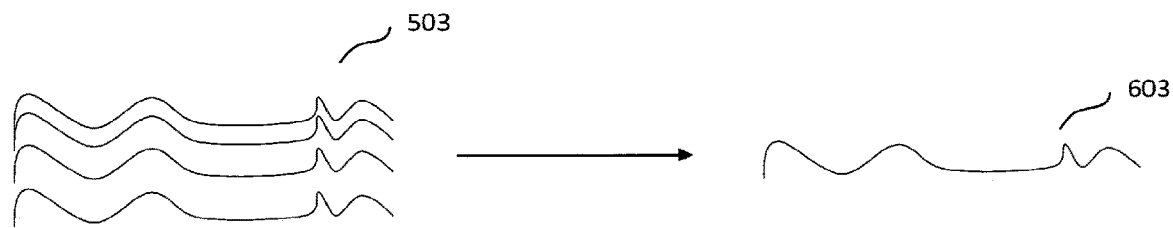

Referring to FIGS. 6A, 6B and 6C, reference waveform patterns for different groups are illustrated. For example, for group 501 the reference waveform pattern (601) is indicated in FIG. 6A. Likewise, for group 502, the reference waveform pattern (602) is indicated in FIG. 6B and for group 503, the reference waveform pattern (603) is indicated in FIG. 6C.

In an embodiment, an auto-encoder is an unsupervised technique used to learn spatial and characteristic information of supplied input training waveforms and reconstruct output waveforms (reference waveform pattern). In one embodiment, the auto-encoder comprises of two parts, namely an encoder and a decoder. Encoder is a combination of one or more interconnected hidden layers with different weights to each interconnection. Each hidden layer is a set of artificial neurons. The artificial neuron comprises an activation function that converts the input data and apply to the activation function and produces the output. For example, sigmoid, tan h, or rectified liner functions can be used as an activation function. The first layer (input layer) of encoder size is equal to the size of the specific group length. In one embodiment, the encoder may perform dimensionality reduction to represent the entire input waveform (training/test waveform) into a set of smallest possible feature set. The last layer of the encoder is of the size of smallest feature set that can represent the input waveform.

Figure 7:
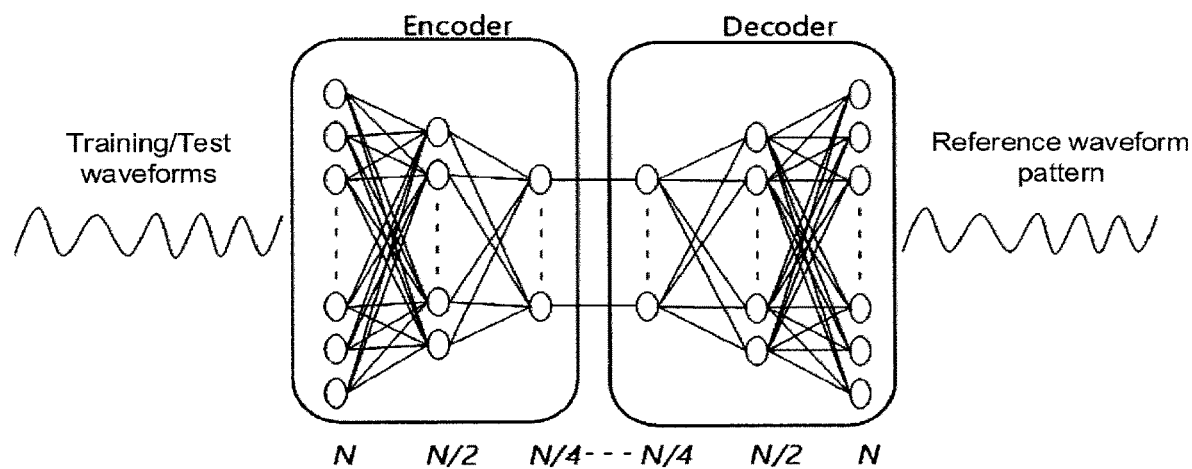
FIG. 7 shows an exemplary block diagram of an autoencoder for developing a model for detecting anomalies in waveforms, in accordance with an embodiment of the present disclosure.

In one embodiment, the decoder is one or more fully interconnected layers with different weight to each interconnection, each layer comprises of a set of artificial neurons. The decoder works in contrast to the encoder. The first layer of decoder size may be equal to the last layer of encoder. The last layer (output layer) of the decoder size may be equal to the first layer of the encoder. For each given test waveform, the trained auto-encoder may produce a same length output reference waveform pattern. In an embodiment, there may be two modes of operating an auto-encoder: learning and detecting. In the learning mode, the model may learn or update the connected weights and produce the output reference waveform pattern. In the detection mode, the auto encoder weights may not be updated, but may be used to produce reference waveform pattern. This reference waveform pattern may be supplied to anomaly range estimation module (206). An example of model building using auto-encoder is shown in FIG. 7. In FIG. 7, N is the size of a training waveform of the corresponding group.

Figure 8:
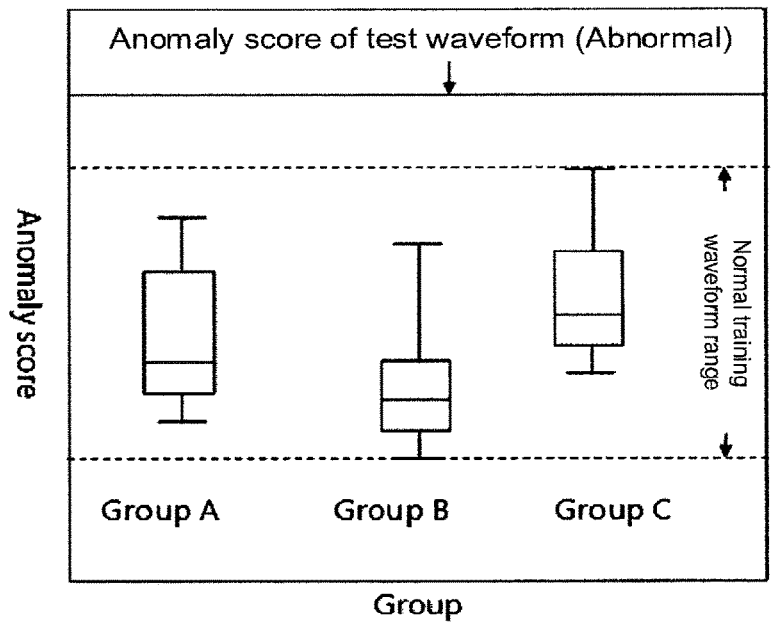
FIG. 8 shows a graph illustrating anomaly score for the plurality of waveforms for detecting anomalies in waveforms, in accordance with an embodiment of the present disclosure.

Referring back to FIG. 3, at step 306, the anomaly range estimation module (206) determines an anomaly range for each reference waveform pattern. The anomaly range estimation module (206) determines the range of anomaly scores for normal waveform (expected data) included in the plurality of training waveforms. Anomaly scores for each model associated with each group may be calculated separately. The anomaly scores calculated for the reference waveform pattern can act as reference scores while comparing with anomaly scores of test waveforms, to detect anomalies in the test waveforms. FIG. 8 shows an example of box plot of the anomaly scores of various groups, which defines the range of anomaly scores of normal waveforms.

In an embodiment, the anomaly score of a test waveform is a distance between a test waveform and the corresponding reference waveform pattern. For example, in case of auto-encoder it can be a Euclidian distance between the test waveform and the reference waveform pattern. This distance can also be Global Alignment Kernel Distance, Shape Based Distance, DTW distance, Mahalanobis distance or a weighted combination of these distances.

The anomaly classification module (207) classifies a test waveform as either normal or abnormal (anomalous). This module can classify into multiple groups if the models are built in that way. Since there are multiple models, the anomaly scores of the test waveform may be combined using a rule, such as if the OR rule—the test waveform may be classified as abnormal if the anomaly score is within the range of the anomaly scores of any single model. Here, another way of using the model and classifying the test waveform is presented. Once the test waveform is supplied to the grouping module (204), the test waveform will be compared to all the characteristic group representative patterns to find the best matching characteristic group (category). For this purpose, a distance metric, such as DTW distance may be used. The closest matching representative pattern may decide the characteristic group of the test waveform. Once the group is assigned, the corresponding model is used to produce the reference waveform pattern and supplied to the anomaly range estimation module (206).

Figure 9:
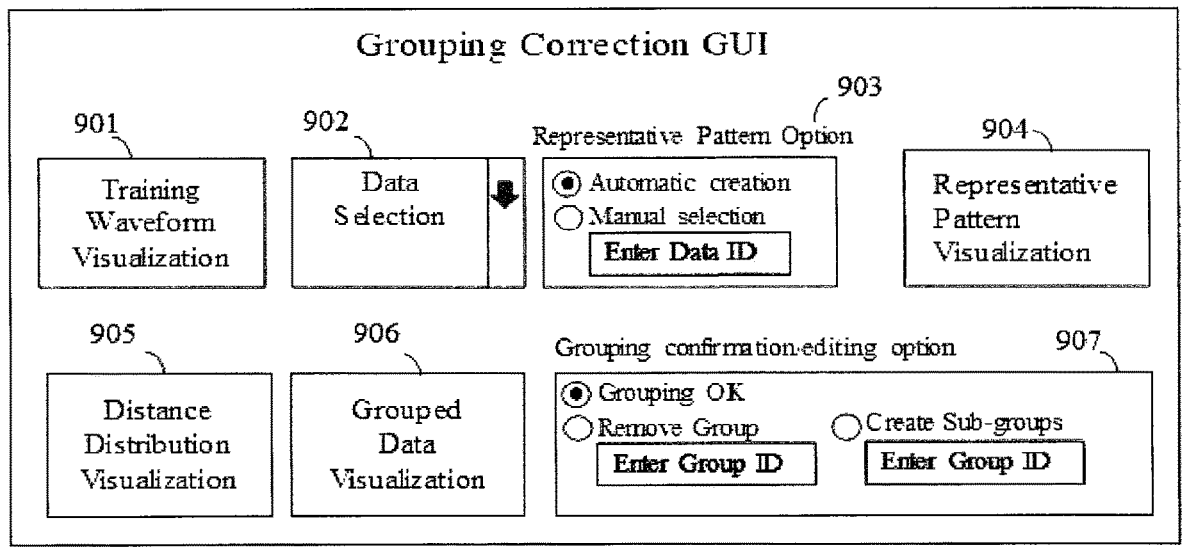
FIG. 9 shows a GUI in anomaly detection system, for making corrections in groups created during learning stage, in accordance with an embodiment of the present disclosure.

In a further embodiment, a grouping correction module may refine the grouping of the training waveforms. This module may perform a number of tasks, including confirming the grouping results, selecting a group for removal or selecting a group for sub-grouping. These tasks may be performed by a user or an expert with the help of a Graphical User Interface (GUI) as shown in FIG. 9, in the anomaly detection system (103). Since the one or more training waveforms comprises noise and uneven distribution of the number of patterns, the grouping correction module may be employed repeatedly until a desirable grouping of the training waveforms is found.

In one embodiment, the GUI may include training waveform visualization (901), data selection (902), representative pattern option (903), representative pattern visualization (904), distance distribution visualization (905), grouped data visualization (906), and grouping (category) confirmation/editing option (907).

The training waveform visualization (901) shows a list of the IDs (number) of the one or more training waveforms. When an operator selects a group ID, the corresponding training waveform is visualized. Data selection (902) shows the list of training waveforms to be used for grouping. The representative pattern option (903) shows an option of creating a representative pattern. In an embodiment, an automatic creation and a manual selection are shown. In case of automatic creation option, the representative pattern is created automatically. In case of manual selection, the ID of the selected test waveform is entered into a text box, for example "Enter Data ID", or by clicking on a list shown in the data selection, and the selected training waveform is used as the representative pattern.

The representative pattern visualization (904) shows the visualized data of the representative pattern. The distance distribution visualization (905) shows the frequency distribution of the distance between the representative pattern and each of the one or more training waveforms, as calculated by distance calculation unit. By looking at the visualized results, an operator may confirm whether the number of grouping is correct or not.

The grouped data visualization (906) shows the visualized data of the grouped data, which holds the grouped training waveforms. By looking at the visualized results, an operator can confirm whether the number of grouping is correct or not.

In one embodiment, the grouping confirmation/editing option (907) may provide the operator three options: confirmation of results (Group OK), selection of a group for removal (Remove Group) or creation of sub-group (Create Sub-groups). This may be helpful when the data contains one or more unwanted groups or the anomaly detection system (103) cannot automatically create desirable grouping of the training waveforms. In case of selection of a group for removal (Remove Group) or creation of sub-group (Create Sub-groups), the ID of the selected group may be entered through a text box, for example "Enter Group ID."

In an embodiment, a group representative pattern may be generated by the representative waveform generator (202) for each group. The group representative pattern of a group may be used by a model associated with that group to build a reference waveform pattern.

Figure 10:
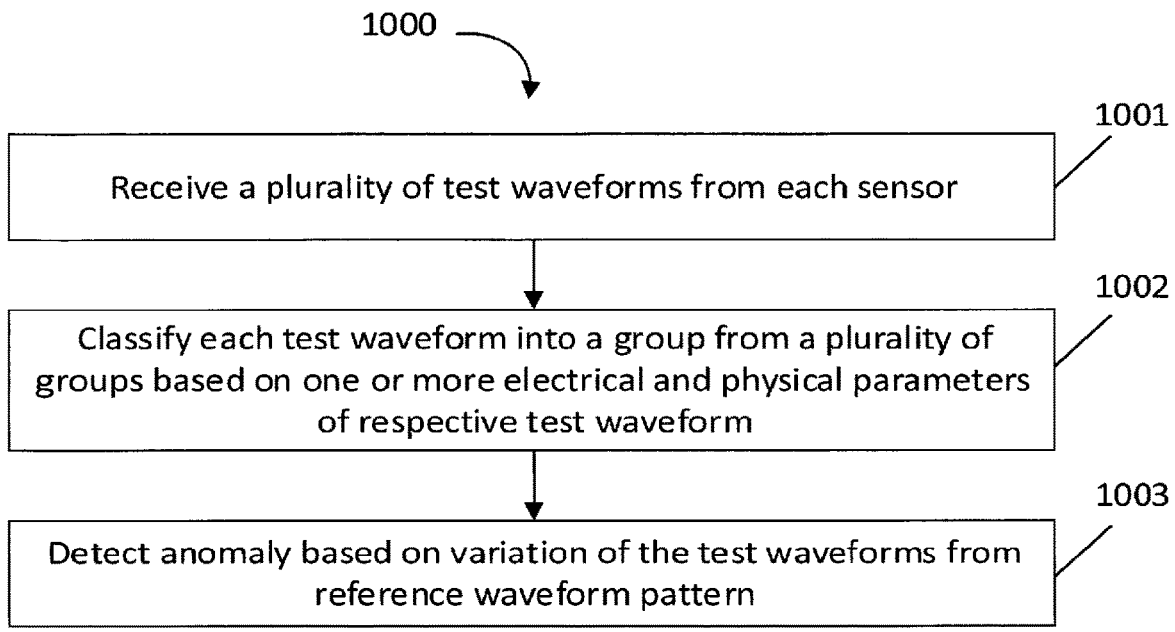
FIG. 10 shows an exemplary flow chart illustrating method steps for detecting anomalies in waveforms, in accordance with an embodiment of the present disclosure.

FIG. 10 shows a flow chart illustrating method steps to detect anomaly in a plurality of test waveforms.

At step 1001, the input module (201) receives the plurality of test waveforms from the plurality of sensors (101). The plurality of test waveforms may be received in real-time.

At step 1002, the grouping module (204) groups each of the plurality of test waveforms into a group from the plurality of groups based on the one or more electrical and physical properties associated with the respective waveforms.

At step 1003, the anomaly classification module (207) detects an anomaly in the plurality of test waveforms by comparing an anomaly score of each test waveform with corresponding anomaly range calculated for respective reference waveform pattern.

To classify a test waveform based on anomaly score, a simple thresholding technique that satisfies acceptable false positive rate or a simple decision tree that defines the rules of classification, may be used for each group. For example, as a thresholding technique, the box plots shown in FIG. 8 decides the range of anomaly score of normal waveform. If the anomaly score is out of the range for a test waveform, it is classified as anomaly.

Figure 11:
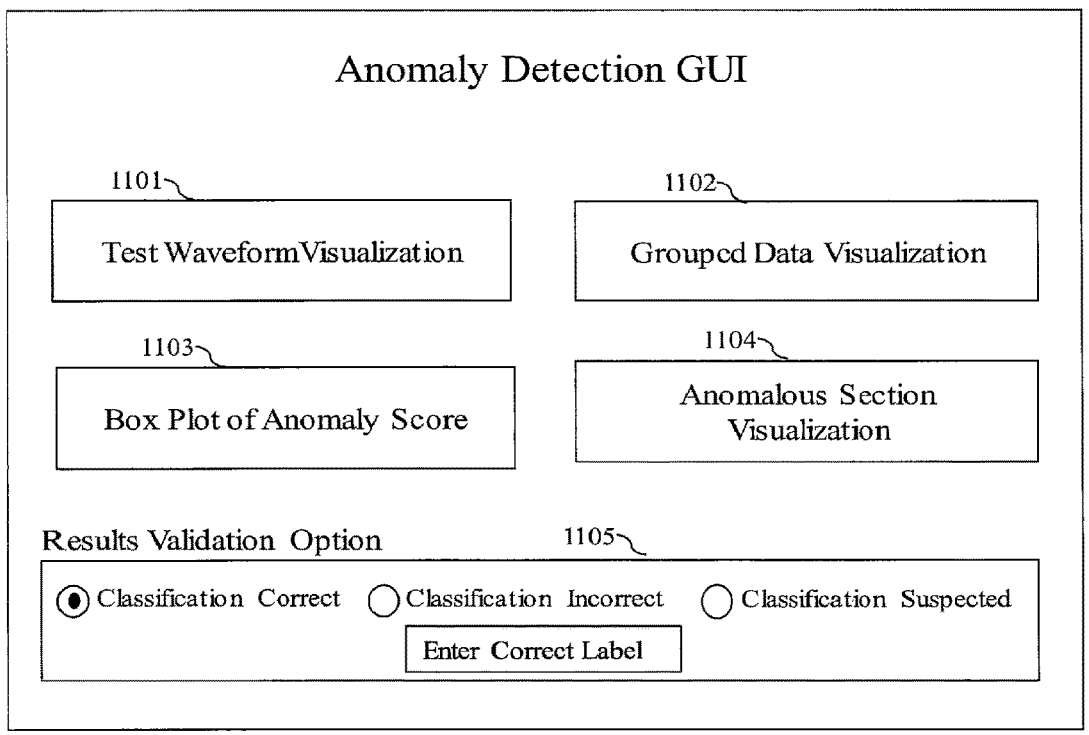
FIG. 11 shows a GUI in anomaly detection system, for validating results of anomaly detections, in accordance with an embodiment of the present disclosure.

A GUI corresponding to the anomaly classification module (207) may be provided in the anomaly detection system (103) as shown in FIG. 11. This GUI may be used to support the classification results, that is, as the evidence of judgment of classification results. The GUI may comprise of test waveform visualization (1101), grouped data visualization (1102), box plot of anomaly score (1103), anomalous section visualization (1104), and results validation option (1105).

The test waveform visualization (1101) may show the visualization of the test waveform. Grouped data visualization (1102) may show the grouped data. Grouped data visualization (1102) may also show the representative pattern of each characteristic group of training waveforms. Box plot of anomaly score (1103) may show the box plot of the anomaly scores of various models. Anomalous section visualization (1104) may show the section of anomalous data in the test waveform that is different from the normal training waveform. Results validation option (1105) may be used by an expert/operator who validates the classification results. The classified results may be correct, incorrect or suspicious. These validation results along with the test waveform may be used in future for further training of the models or update of the models. If the classified results are incorrect, the expert enters the correct label of the test waveform through the textbox "Enter Correct Label."

In an embodiment, the method and system as disclosed detects anomalies accurately in waveforms. In an embodiment, the method and system detect any variation in normal data and avoids false classifications.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3, and FIG. 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Industrial plant |
| 101 | Sensors |
| 102 | Equipment |
| 103 | Anomaly detection system |
| 104 | Notification unit |
| 201 | Input module |
| 202 | Representative waveform generator |
| 203 | Variation detection module |
| 204 | Grouping module |
| 205 | Model building module |
| 206 | Anomaly range estimation module |
| 207 | Anomaly classification module |
| 401 | Representative waveform pattern |
| 501, 502, 503 | Groups |
| 601, 602, 603 | Reference waveform patterns |
| 901 | Training Waveform Visualization |
| 902 | Data Selection |
| 903 | Representative pattern option |
| 904 | Representative pattern visualization |
| 905 | Distance distribution visualization |
| 906 | Grouped data visualization |
| 907 | Grouping confirmation/editing option |
| 1101 | Test Waveform visualization |
| 1102 | Grouped data visualization |

| Reference number | Description |
|---|---|
| 1103 | Box plot of Anomaly score |
| 1104 | Anomalous section visualization |
| 1105 | Result validation option |

We claim:

1. An anomaly detection system for detecting anomalies in waveforms in an industrial plant, wherein the industrial plant comprises a plurality of equipment being monitored by a plurality of sensors, wherein each sensor generates a plurality of training waveforms and a plurality of test waveforms based on the monitoring, the anomaly detection system comprising:
   an input module to receive the plurality of training waveforms and the plurality of test waveforms from each sensor;
   a processor configured to:
      generate a representative waveform pattern using the plurality of training waveforms from each sensor, the representative waveform pattern being found by iteratively minimizing a sum of distances between the representative waveform pattern and the training waveforms;
      group each training waveform into a group from a plurality of groups based on a deviation between each training waveform and the representative waveform pattern, the groups being created based on the distances between the representative waveform pattern and the training waveforms, the deviation being determined in one or more electrical and physical parameters of each of the plurality of training waveforms from electrical and physical parameters of the representative waveform pattern; and
      detect anomaly in at least one of the plurality of test waveforms if an anomaly score generated for at least one of the plurality of test waveforms lies beyond an anomaly range generated for a corresponding reference waveform pattern associated with the group, the anomaly score being a distance between the test waveform and the corresponding reference waveform pattern.

2. The anomaly detection system as claimed in claim 1, wherein the processor is configured to group each training waveform into a best matching group from the plurality of groups based on the deviation.

3. The anomaly detection system as claimed in claim 1, wherein the processor is configured to:
   build one or more models for each group based on the training waveforms in respective group; and
   generate the reference waveform pattern for each group based on the one or more models of respective group.

4. The anomaly detection system as claimed in claim 1, wherein the processor is further configured to estimate the anomaly range of anomaly scores for each reference waveform pattern.

5. The anomaly detection system as claimed in claim 1, wherein the processor is further configured to group each test waveform into respective groups based on one or more electrical and physical parameters of respective test waveforms.

6. The anomaly detection system as claimed in claim 4, wherein the processor is further configured to detect the anomaly in each test waveform by performing:
   determining the anomaly score for each test waveform; and
   comparing the anomaly score of each test waveform with the anomaly range of anomaly scores of a reference waveform pattern of the corresponding group for detecting an anomaly in each test waveform.

7. The anomaly detection system as claimed in claim 5, wherein the one or more electrical and physical parameters comprises at least one of current, voltage, shape, amplitude, frequency, and phase.

8. The anomaly detection system as claimed in claim 3, wherein the processor is further configured to generate a group representative waveform pattern for each group, wherein the group representative waveform pattern is used by corresponding one or more models to generate the reference waveform pattern, wherein the reference waveform pattern indicates expected signals.

9. A method for detecting anomalies in waveforms in an industrial plant, wherein the industrial plant comprises a plurality of equipment being monitored by a plurality of sensors, wherein each sensor generates a plurality of training waveforms and a plurality of test waveforms based on the monitoring, the method comprising:
   receiving, by an input module, the plurality of training waveforms and the plurality of test waveforms from each sensor;
   generating, by a processor, a representative waveform pattern using the plurality of training waveforms from each sensor, the representative waveform pattern being found by iteratively minimizing a sum of distances between the representative waveform pattern and the training waveforms;
   grouping, by the processor, each training waveform into a group from a plurality of groups based on a deviation between each training waveform and the representative waveform pattern, the groups being created based on the distances between the representative waveform pattern and the training waveforms, the deviation being determined in one or more electrical and physical parameters of each of the plurality of training waveforms from electrical and physical parameters of the representative waveform pattern; and
   detecting, by the processor, an anomaly in each test waveform if an anomaly score generated for at least one of the plurality of test waveforms lies beyond an anomaly range generated for a corresponding reference waveform pattern associated with the group, the anomaly score being a distance between the test waveform and the corresponding reference waveform pattern.

10. The method as claimed in claim 9, wherein each training waveform is grouped into a best matching group from the plurality of groups based on the deviation.

11. The method as claimed in claim 9, further comprising:
   building one or more models for each group based on the training waveforms in respective group; and
   generating the reference waveform pattern for each group based on the one or more models of respective group.

12. The method as claimed in claim 11, further comprises estimating the anomaly range of anomaly scores for each reference waveform.

13. The method as claimed in claim 9, further comprises grouping each test waveform into respective group based on one or more electrical and physical parameters of respective test waveforms.

14. The method as claimed in claim 13, further comprises:
determining the anomaly score for each test waveform; and
comparing the anomaly score of each test waveform with the anomaly range of anomaly scores of a reference waveform pattern of the corresponding group for detecting an anomaly in each test waveform.

15. The method as claimed in claim 13, wherein the one or more electrical and physical parameters comprises at least one of current, voltage, shape, amplitude, frequency, and phase.

16. The method as claimed in claim 11, wherein grouping further comprises generating a group representative waveform pattern for each group, wherein the group representative waveform pattern is used by corresponding one or more models to generate the reference waveform pattern, wherein the reference waveform pattern indicates expected signals.

17. A non-transitory computer readable medium including instructions stored thereon that when processed by at least one processor cause a device to perform operations comprising:
receiving the plurality of training waveforms and the plurality of test waveforms from each sensor;
generating a representative waveform pattern using the plurality of training waveforms from each sensor, the representative waveform pattern being found by iteratively minimizing a sum of distances between the representative waveform pattern and the training waveforms;
grouping each training waveform into a group from a plurality of groups based on a deviation between each training waveform and the representative waveform pattern, the groups being created based on the distances between the representative waveform pattern and the training waveforms, the deviation being determined in one or more electrical and physical parameters of each of the plurality of training waveforms from electrical and physical parameters of the representative waveform pattern; and
detecting an anomaly in each test waveform using the grouped training waveforms if an anomaly score generated for at least one of the plurality of test waveforms lies beyond an anomaly range generated for a corresponding reference waveform pattern associated with the group, the anomaly score being a distance between the test waveform and the corresponding reference waveform pattern.

* * * * *